Patented June 23, 1931

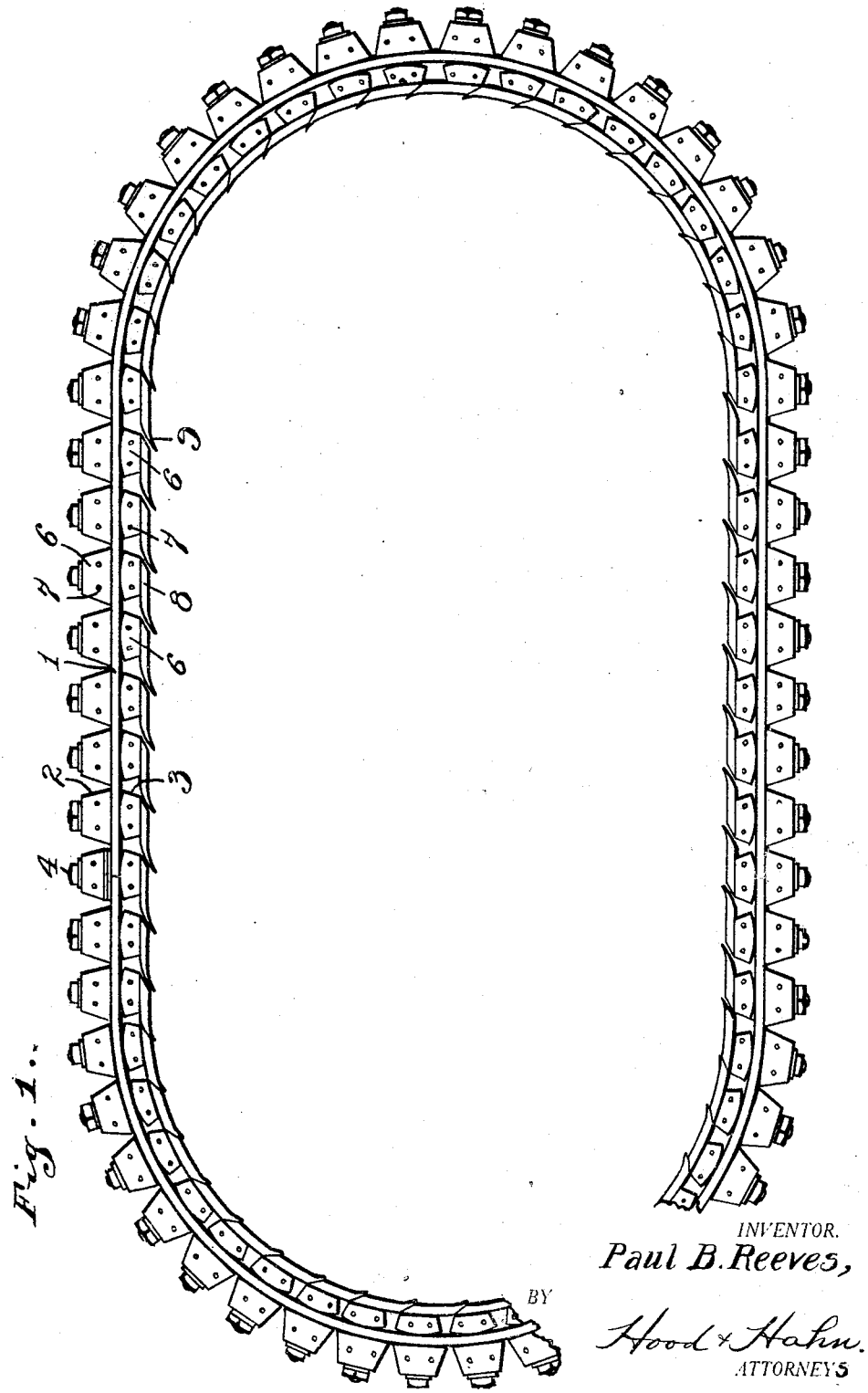

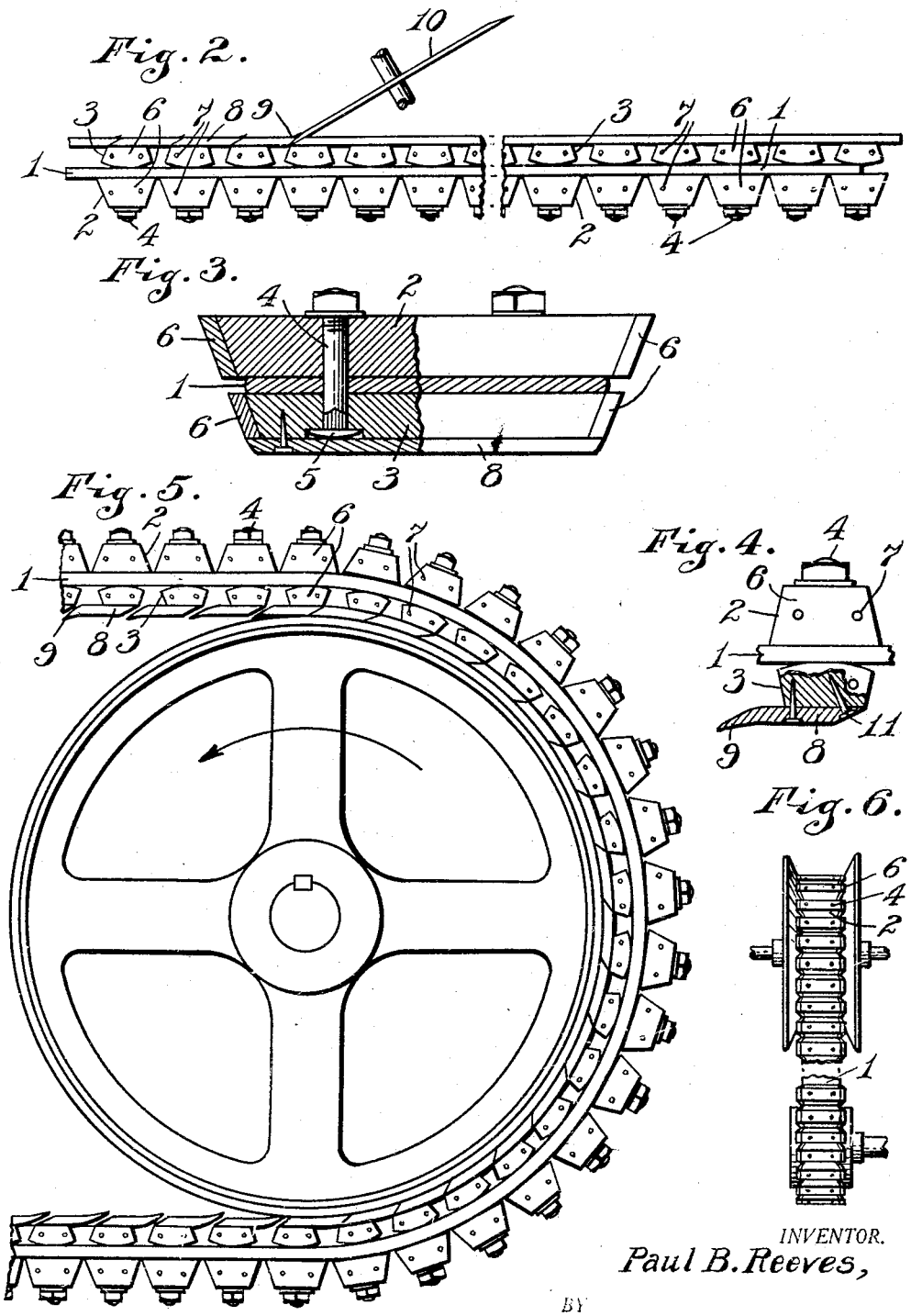

1,811,826

UNITED STATES PATENT OFFICE

PAUL B. REEVES, OF COLUMBUS, INDIANA, ASSIGNOR TO REEVES PULLEY COMPANY, OF COLUMBUS, INDIANA, A CORPORATION OF INDIANA

POWER TRANSMISSION BELT

Application filed March 22, 1929. Serial No. 349,082.

My invention relates to improvements in belts and particularly to edge and face drive belts adapted to cooperate with both cone and flat faced pulleys.

It is one of the objects of my invention to provide a belt for driving with cone pulleys and with flat pulleys, which shall be effective in operation, and may be readily manufactured, and which will provide a silent drive in connection with both types of pulleys.

My invention also relates to the method of forming such belts.

For the purpose of disclosing my invention, I have illustrated in the accompanying drawings one embodiment thereof in which:

Fig. 1 is a side elevation of a belt embodying my invention;

Fig. 2 is a view showing the manner of assembling the face drive friction surface;

Fig. 3 is a sectional view of a belt embodying my invention, the blocks being shown partly in section;

Fig. 4 is a detail showing the manner of securing the flat face friction material in position;

Fig. 5 is a side elevation showing the belt drive over a flat pulley and;

Fig. 6 is a view showing an application of my belt.

My belt is primarily designed to cooperate with that type of cone pulley transmission known in the commercial art as the "Reeves" transmission. This type of transmission embodies a pair of cone pulleys mounted on a shaft and adapted to be moved toward and from one another to vary the effective diameter of the pulleys. In certain embodiments of this type, the belt is adapted also to cooperate with and drive and be driven from a flat faced pulley.

In the structure illustrated, the belt is composed of a comparatively thin medial web 1, which may be of any suitable rubberized canvas material, to the outer and inner face of which are secured in pairs and at regular intervals, rigid cross bars 2 and 3, conveniently of wood, the ends of which are oppositely and inwardly inclined toward the inner face of the bars 3 to correspond with the angles of the faces of the cone pairs with which they are adapted to cooperate. These cross bars are secured to the web 1 by bolts 4 which pass through the upper and lower bars 2 and 3, clamping the web between the same. The heads 5 of the bolts are counter-sunk in the inner face of the bar 3 so that a smooth surface is presented. The inclined surfaces of the cross bars 2 and 3 are faced with friction material 6, such as leather which may be secured in any suitable manner as by glue, brads or nails 7, driven therethrough and into the cross bars.

The inner faces of the cross bars 3 are likewise faced with friction material which may be, if desired, the same material as that from which the medial web is constructed or may be leather or any other desired material. The friction material is formed in a plurality of sections 8, one for each cross bar, each secured at one end to the inner face of the cross bar, the other end 9 being free and adapted to overlap the rear edge of the next adjacent section. The rear edge of each section 8 is chamfered on its outer face to coincide with the chamfered front edge of the next adjacent section, which section, as shown, is chamfered on its inner face. The overlapping of the sections is such that when the belt is used for driving a flat pulley, the overlapping sections form a continuous friction surface adapted to engage the surface of the pulley. Due to the fact that the flat friction face is in sections, the diameter of the belt may be varied without destroying continuity of the friction face. In operation as illustrated in Fig. 5, the belt drives in the direction of the arrow; that is, with the free ends of the sections in advance. I have discovered from actual experience that such a drive is quiet and does not produce a flapping of the sections.

In constructing my belt, the web 1 and blocks 2 and 3 are first assembled, after which the belt is laid out flat with its under face upward and a continuous belt is secured by means of brads to the inner faces of the blocks 3. After the belt has been secured in position it is sliced diagonally, preferably, by a rotary knife 10 as illustrated in Fig. 2 to produce the sections 8. After the sections have been cut, each section is additionally secured to the face of the block by means of brads 11 which are driven through the top chamfered portion.

I claim as my invention the following:

1. An edge and face drive belt comprising a flexible belt member having secured thereto at regularly spaced intervals and on the inner faces thereof transversely extending blocks, wedge shaped in cross section, and a flat friction belt secured on the inner faces of said blocks and comprising a plurality of overlapping sections.

2. An edge and face drive belt comprising a flexible belt member having secured thereto at regularly spaced intervals and on the inner face thereof transversely extending blocks, wedge shaped in cross sections, and a flat friction belt on the inner faces of said blocks comprising a plurality of overlapping sections, one section to each block.

3. An edge and face drive belt comprising a flexible belt member having secured thereto at regularly spaced intervals and on the inner face thereof transversely extending blocks, wedge shaped in cross section, and a flat friction belt secured on the inner faces of said blocks and comprising a plurality of overlapping sections having their overlapping edges chamfered.

4. An edge and face drive belt comprising a flexible belt member having secured thereto at regularly spaced intervals and on the inner face thereof transversely extending blocks, wedge shaped in cross section, and a flat friction belt on the inner faces of said blocks comprising a plurality of overlapping sections each secured at one end to a block and having its free end extending in the direction of travel of the belt.

5. An edge and face drive belt comprising a flexible belt member having secured thereto at regularly spaced intervals and on the inner face thereof transversely extending blocks, wedge shaped in cross section and a flat friction belt on the inner faces of said blocks comprising a plurality of overlapping sections each secured at one end to a block and having its free end facing in the direction of travel of the belt, the overlapping edges of said sections being chamfered.

6. An edge and face drive belt comprising a flexible belt member having secured thereto at regularly spaced intervals and on the inner face thereof transversely extending blocks, wedge shaped in cross sections, and a flat friction belt on the inner faces of said blocks comprising a plurality of overlapping sections, each secured at one end to a block and having its free end facing in the direction of travel of the belt, the secured end of the section being chamfered at its edge on its outer face and the free end being chamfered at its edge on its inner face.

7. An edge and face drive belt comprising a flexible continuous member having secured to the inner face thereof a series of spaced blocks, wedge shaped in cross section, and a friction member secured to the inner face of each of said blocks, one end of each of said friction members being formed with a chamfer lying wholly within the limits of its block, and the opposite end of each of said friction members being oppositely chamfered and overlapping the adjacent end of the next adjacent friction member.

In witness whereof, I PAUL B. REEVES, have hereunto set my hand at Columbus, Indiana, this 4th day of March, A. D. one thousand nine hundred and twenty-nine.

PAUL B. REEVES.